United States Patent
Jang et al.

(10) Patent No.: US 8,160,646 B2
(45) Date of Patent: Apr. 17, 2012

(54) APPARATUS AND METHOD FOR ALLOCATING PREAMBLE INDEX OF SELF CONFIGURATION BASE STATION IN BROADBAND WIRELESS COMMUNICATION SYSTEM

(75) Inventors: Byoung-Gi Jang, Suwon-si (KR); In-Seok Hwang, Seoul (KR); Byoung-Ha Yi, Seoul (KR); Soon-Young Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 12/462,890

(22) Filed: Aug. 11, 2009

(65) Prior Publication Data

US 2010/0040000 A1    Feb. 18, 2010

(30) Foreign Application Priority Data

Aug. 13, 2008    (KR) .................. 10-2008-0079238

(51) Int. Cl.
*H04B 1/38* (2006.01)
*H04M 1/00* (2006.01)

(52) U.S. Cl. ........ 455/561; 455/517; 455/524; 455/525; 455/451

(58) Field of Classification Search .................. 455/450, 455/451, 452.1, 507, 509, 510, 517, 524, 455/525, 561
See application file for complete search history.

(56) References Cited

U.S. PATENT DOCUMENTS

| | | | | |
|---|---|---|---|---|
| 5,943,621 | A | * | 8/1999 | Ho et al. .................. 455/456.3 |
| 2008/0205492 | A1 | * | 8/2008 | Gorday et al. ............. 375/150 |
| 2008/0232513 | A1 | * | 9/2008 | Wang et al. .............. 375/340 |

* cited by examiner

*Primary Examiner* — Tuan Pham

(57) ABSTRACT

Provided is an apparatus and method for allocating a preamble index of a Self-Configuration or Self-Configurable (SC) Base Station (BS) in a broadband wireless communication system. An SC BS apparatus in a broadband wireless communication system includes a detector, a controller, and a generator. The detector detects at least one preamble signal for preamble index allocation by using a signal received from at least one other BS. The controller requests information used by at least one other SC BS for preamble index allocation and allocates a preamble index for the SC BS by using the detection result of the preamble signal and the information received from the at least one other SC BS. The generator generates a preamble signal corresponding to the preamble index allocated by the controller.

20 Claims, 4 Drawing Sheets

APPARATUS AND METHOD FOR ALLOCATING PREAMBLE INDEX OF SELF CONFIGURATION BASE STATION IN BROADBAND WIRELESS COMMUNICATION SYSTEM

CROSS-REFERENCE TO RELATED APPLICATION(S) AND CLAIM OF PRIORITY

The present application is related to and claims priority under 35 U.S.C. §119 to an application filed in the Korean Intellectual Property Office on Aug. 13, 2008 and assigned Serial No. 10-2008-0079238, the contents of which are incorporated herein by reference.

TECHNICAL FIELD OF THE INVENTION

The present invention relates generally to a broadband wireless communication system using a Self-Configuration or Self-Configurable (SC) Base Station (BS) and, in particular, to an apparatus and method for allocating a preamble index of an SC BS in a broadband wireless communication system.

BACKGROUND OF THE INVENTION

With the development of communication and multimedia technologies, large-capacity transmission technologies are being applied to mobile communication systems. One of the core issues is an increase in radio capacity. The simplest scheme for increasing radio capacity is to allocate more frequency bands, but this is difficult to implement due to limited frequency resources. What is, therefore, required is a method for using limited frequency resources more efficiently. To this end, a method for increasing the frequency efficiency and a method for reducing the service cell size are considered. In particular, by reducing the service cell size, a better radio environment can be provided to a plurality of user terminals.

A femto cell, according to a method for reducing the service cell size, provides a service of a micro BS used in an indoor place such as home or office. A femto cell provides a wired/wireless integrated service at a low cost by means of mobile phones and the Internet. A macro BS serving a macro cell is installed by a mobile communication provider, whereas a micro BS (i.e., an SC BS) serving a femto cell is installed by a user. Thus, there may be a plurality of SC BSs that serve a femto cell within the macro cell of a macro BS. Also, the SC BSs may be installed or removed at the user's discretion.

Transmission of a preamble signal for frame synchronization is necessary for an operation of a BS. Thus, it is self-evident that the SC BSs can also transmit preamble signals. In this case, it is necessary to physically divide preamble signals transmitted by different BSs. Herein, preamble indexes are used to divide the preamble signals. The preamble index includes a segment IDentifier (ID) and an ID cell, which are parameters related to a preamble code, scrambling, and sub-channelization. Thus, if two adjacent BSs use the same preamble index, a strong interference occurs between the preamble signals of the adjacent BSs. Therefore, the preamble indexes can be suitably allocated.

What is being considered is a broadband wireless communication system that uses SC BSs to increase radio capacity as described above. However, because the SC BSs are installed and removed at the user's discretion, the parameters for operating the SC BSs can be set adaptively according to the communication environments. In particular, a preamble index can be set as a basic parameter for operating the SC BS as a base station. What is, therefore, required is a scheme for suitably allocating the preamble indexes of the SC BSs in a broadband wireless communication system.

SUMMARY OF THE INVENTION

To address the above-discussed deficiencies of the prior art, it is a primary object of the present invention to provide an apparatus and method for allocating a preamble index of an SC BS in a broadband wireless communication system.

Another object of the present invention is to provide an apparatus and method for reducing the time taken to allocate a preamble index of an SC BS in a broadband wireless communication system.

Another object of the present invention is to provide an apparatus and method for allocating a preamble index of an SC BS in a broadband wireless communication system by using information used to allocate preamble indexes to other SC BSs.

Another object of the present invention is to provide an apparatus and method for allocating a preamble index of an SC BS in a broadband wireless communication system by using the preamble signal detection results of a plurality of SC BSs.

According to an aspect of the present invention, an SC BS apparatus in a broadband wireless communication system includes: a detector detecting at least one preamble signal for preamble index allocation by using a signal received from at least one other BS; a controller requesting information used by at least one other SC BS for preamble index allocation and allocating a preamble index for the SC BS by using the detection result of the preamble signal and the information received from the at least one other SC BS; and a generator generating a preamble signal corresponding to the preamble index allocated by the controller.

According to another aspect of the present invention, a method for managing a preamble index of an SC BS in a broadband wireless communication system includes: detecting at least one preamble signal for preamble index allocation by using a signal received from at least one other BS; requesting information used by at least one other SC BS for preamble index allocation; allocating a preamble index for the SC BS by using the detection result of the preamble signal and the information received from the at least one other SC BS; and generating a preamble signal corresponding to the allocated preamble index.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a technique for allocating a preamble index of a Self-Configuration or Self-Configurable (SC) Base Station (BS) in a broadband wireless communication system. The following description is made in the context of an Orthogonal Frequency Division Multiplexing (OFDM)/Orthogonal Frequency Division Multiple Access (OFDMA) wireless communication system to which the present invention is not limited. Thus, it should be clearly understood that the present invention is also applicable to any other wireless communication systems.

An initially-installed SC BS performs an Over-The-Air Receiver (OTAR) process before operating as a base station. In the OTAR process, the SC BS measures the signal strengths of adjacent SC BSs and adjacent macro BSs by receiving signals like user terminals without transmitting downlink signals. The SC BS determines available Frequency Assignment (FA), transmit (TX) power, neighbor list, and preamble index on the basis of information collected through the OTAR process.

The SC BS measures the receive (RX) strengths of preamble signals of adjacent BSs through an OTAR process, and detects the distribution of the adjacent BSs on the basis of the measured RX strengths of the preamble signals. However, if a plurality of SC BSs are present in one cell, it is difficult to identify each BS only by the RX strength of a preamble signal. Thus, an SC BS according to the present invention identifies each BS by using a system information message of each BS as well as the RX strength of a preamble signal. For example, the system information message may be an Uplink Channel Descriptor (UCD) message or a Downlink Channel Descriptor (DCD) message. That is, the SC BS synchronizes with another macro BS or another SC BS and receives/decodes the system information message, thereby detecting the system information of each BS. In this way, the SC BS acquires the RX strengths of preamble signals of other BSs and the system information of other BSs.

Figure 1:
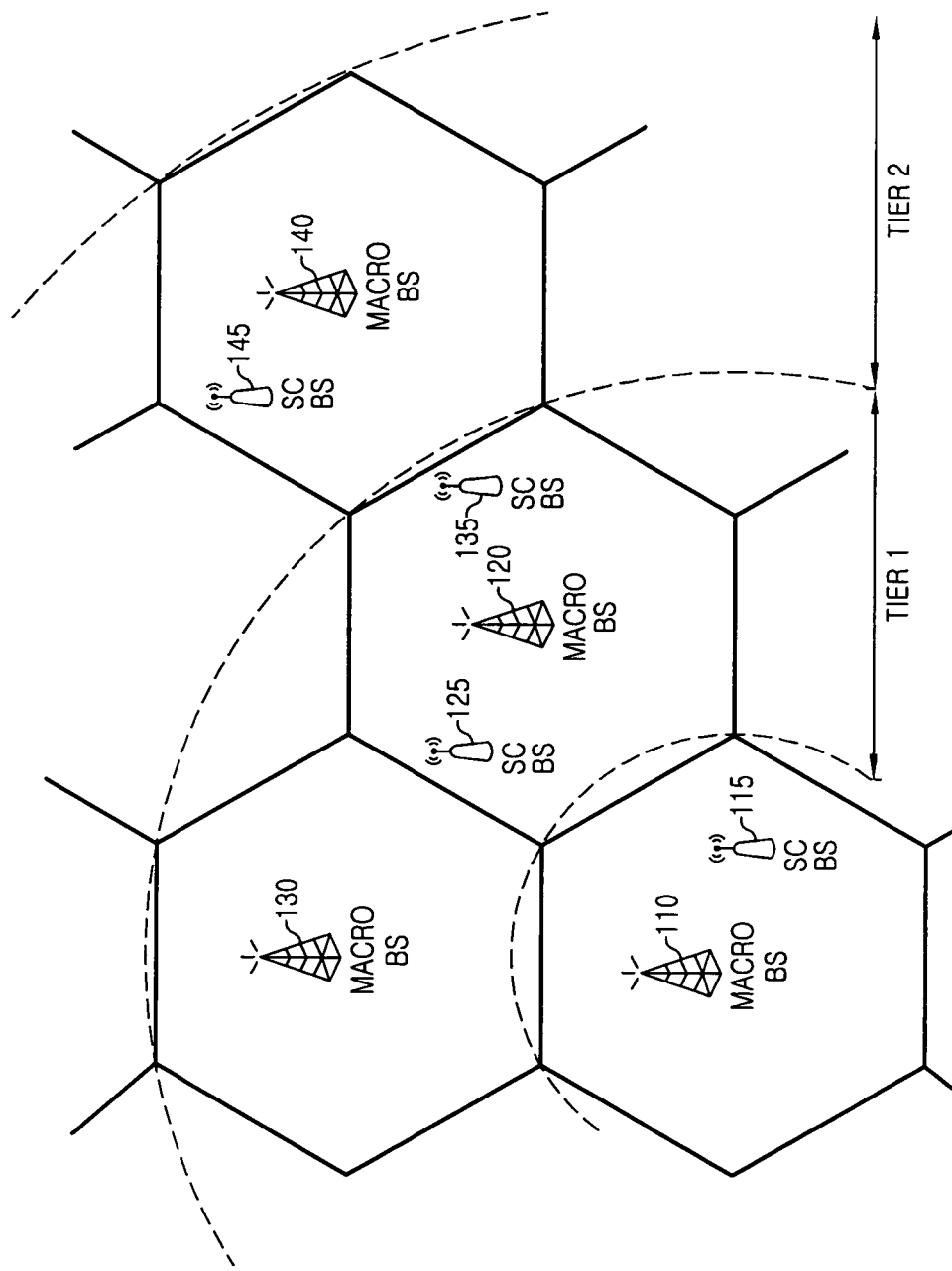
FIG. 1 is a diagram illustrating the arrangement of BSs in a broadband wireless communication system according to an exemplary embodiment of the present invention.

A process for allocating a preamble index using the OTAR process is described below. FIG. 1 illustrates a cell environment assumed in order to describe a preamble index allocation process. Referring to FIG. 1, an SC BS 115 is assumed to be initially installed. A tier 1 and a tier 2 imply the distances from the SC BS 115 to macro cells, where the distance from the SC BS 115 decreases with a decrease in the number. Thus, although not illustrated, a tier 3 more distant than the tier 2 may also be present. Herein, the respective tiers are divided not by the physical distances but by the RX signal strengths in a reference cell.

The initially-installed SC BS 115 performs an OTAR process. Through the OTAR process, the SC BS 115 identifies the preamble indexes of adjacent BSs. Then, the SC BS 115 allocates itself a preamble index that does not overlap with the identified preamble indexes. In this case, it takes a relatively short time to identify the preamble indexes of a macro BS 110, a macro BS 120, a macro BS 130, an SC BS 125, and an SC BS 135 that are located in macro cells belonging to the tier 1. However, it takes a relatively longer time to identify the preamble indexes of a macro BS 140 and an SC BS 145 that are located in a macro cell belonging to the tier 2. The reason for this is that, because the RX strength of the preamble signal is low due to the long distance, a plurality of RX signals are combined in order to acquire a signal value from which the preamble index may be determined. That is, the time taken to identify the preamble index of a corresponding BS increases with an increase in the distance from the corresponding BS. In some cases, the identification of the preamble index may be impossible because the RX strength of the preamble signal is insufficient.

Thus, the SC BS according to the present invention identifies the preamble index of a relatively distant BS not directly but indirectly through information detected by another SC BS. Specifically, the SC BS 115 identifies the preamble indexes of the macro BS 110, the macro BS 120, the macro BS 130, the SC BS 125, and the SC BS 135, which are located in the macro cells belonging to the tier 1, by means of the received preamble signals, and acquires the preamble indexes of the macro BS 140 and the SC BS 145, which are located in the macro cell belonging to the tier 2, from the SC BS 125 or the SC BS 135. That is, the SC BS 125 and the SC BS 135 have already identified the preamble indexes of adjacent BSs through an OTAR process because the SC BS 125 and the SC BS 135 were installed earlier than the SC BS 115. Thus, the SC BS 115 may acquire the preamble measurement information of BSs that are located in macro cells not belonging to the tier 1 by receiving the preamble measurement information generated by the SC BS 125 or the SC BS 135.

That is, the SC BSs directly identify only the preamble indexes of BSs within adjacent macro cells, and acquire the preamble indexes of BSs within other necessary ranges from other SC BSs. Herein, for preamble index allocation, the SC BS 125 and the SC BS 135 also receive the preamble measurement information of BSs within nonadjacent macro cells from other SC BSs. Thus, the SC BS 115 may acquire the preamble measurement information of BSs within macro cells belonging to the tier 3 from the SC BS 125 and the SC BS 135. The preamble measurement information of BSs within the macro cells belonging to the tier 3 may also be acquired from the SC BS 145. That is, the SC BS 115 collects the preamble measurement information that is generated by other SC BSs located within a desired range directly or indirectly from each SC BS, and allocates a preamble index for itself.

A process for receiving the preamble measurement information from other SC BSs is described below. Because all the SC BSs are connected to a backbone network, the preamble measurement information may be received through the backbone network. That is, the SC BS 115 requests the preamble measurement information from the SC BS 125 or the SC BS 135, and the SC BS 125 or the SC BS 135 measures and provides the preamble measurement information upon request by the SC BS 115. At this point, the SC BS 125 or the SC BS 135 may simultaneously provide not only its own preamble measurement information but also preamble measurement information acquired from other SC BSs.

In another exemplary embodiment, the preamble measurement information may be provided from a management server. In general, a wireless communication system using SC BSs includes the management server, which controls the SC BSs. Thus, the management server may manage all the preamble measurement information generated by the respective SC BSs. In this case, the SC BS 115 notifies a range from which to collect preamble measurement information and the intention of collecting preamble measurement information to the management server, and the management server provides the preamble measurement information within the range.

In summary, the SC BS 115 identifies the preamble indexes of BSs within macro cells belonging to the tier 1 through an OTAR process. Then, the SC BS 115 collects the preamble measurement information generated by at least one other SC BS. Thereafter, the SC BS 115 allocates itself a preamble index that is not used by adjacent BSs. Herein, the detailed structure of the preamble measurement information provided by the other SC BS may vary depending on the preamble index allocation rules. For example, the preamble measurement information may include a BS ID, a preamble index, and a preamble signal RX strength. At this point, both of the preamble measurement information generated by the SC BS 115 itself or other SC BSs and a preamble index collision report provided by user terminals may be simultaneously used. The preamble index collision report is to notify that a user terminal has received preamble signals of the same index from different BSs. Thus, upon receiving a preamble index collision report, the SC BS can change the preamble index.

Hereinafter, the configuration and operation of the SC BS allocating the preamble index as described above will be described in detail with reference to the accompanying drawings.

Figure 2:
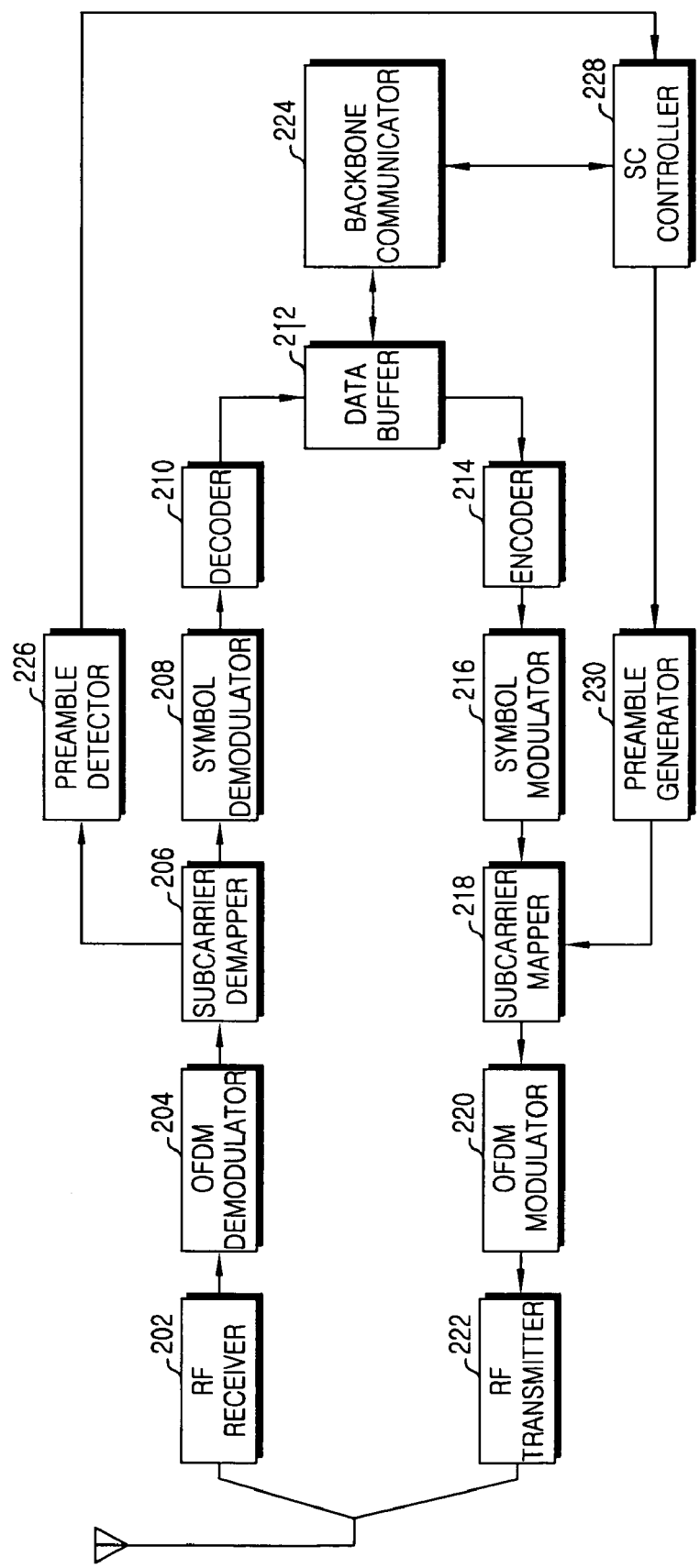
FIG. 2 is a block diagram of an SC BS in a broadband wireless communication system according to an exemplary embodiment of the present invention.

FIG. 2 is a block diagram of an SC BS in a broadband wireless communication system according to an exemplary embodiment of the present invention.

Referring to FIG. 2, the SC BS includes a Radio Frequency (RF) receiver 202, an OFDM demodulator 204, a subcarrier demapper 206, a symbol demodulator 208, a decoder 210, a data buffer 212, an encoder 214, a symbol modulator 216, a subcarrier mapper 218, an OFDM modulator 220, an RF transmitter 222, a backbone communicator 224, a preamble detector 226, an SC controller 228, and a preamble generator 230.

The RF receiver 202 down-converts an RF signal received through an antenna into a baseband signal. The OFDM demodulator 204 divides a signal provided from the RF receiver 202 in units of OFDM symbols, removes a Cyclic Prefix (CP), and restores complex symbols mapped to a frequency domain by a Fast Fourier Transform (FFT) operation. The subcarrier demapper 206 divides the complex symbols mapped to the frequency domain according to the processing units. For example, the subcarrier demapper 206 provides a preamble signal to the preamble detector 226, and provides a data signal to the symbol demodulator 208. The symbol demodulator 208 demodulates the complex symbols into a bit stream. The decoder 210 channel-decodes the bit stream and thus generates an information bit stream. The data buffer 212 temporarily stores information data communicated with user terminals.

The encoder 214 channel-encodes the information bit stream provided from the data buffer 212. The symbol modulator 216 modulates the channel-encoded bit stream into complex symbols. The subcarrier mapper 218 maps the complex symbols to a frequency domain. The OFDM modulator 220 converts the frequency-domain complex symbols into a time-domain signal by an Inverse Fast Fourier Transform (IFFT) operation and inserts a CP to generate an OFDM symbol. The RF transmitter 222 up-converts a baseband signal into an RF signal and transmits the same through the antenna.

The backbone communicator 224 provides an interface for communicating through a backbone network. That is, the backbone communicator 224 generates a packet to be transmitted through a backbone network such as an Ethernet network or an Internet Protocol (IP) network, and analyses a packet received through the backbone network.

In an OTAR mode, the preamble detector 226 detects preamble signals received from adjacent BSs. In other words, the preamble detector 226 identifies preamble indexes used by adjacent BSs. That is, the preamble detector 226 receives an RX signal corresponding to the location of a preamble signal from the subcarrier demapper 206, and correlates the RX signal with each of the preamble signals corresponding to available preamble indexes. If power of more than a threshold level is detected as a result of the correlation operation, the preamble detector 226 detects that the corresponding preamble index is used. At this point, the preamble detector 226 may attempt to detect a preamble signal after combining RX signals received through many times. Herein, the time taken to detect the preamble signal may be the time taken to detect the preamble signals of BSs located in adjacent macro cells. The amount of the time taken may vary depending on the system settings such as the intercell distance and the TX power condition of the preamble signal.

The SC controller 228 performs a setting function for operating the SC BS as a base station. That is, the SC controller 228 determines whether to perform an OTAR process, and controls an overall function for performing the OTAR process. For example, when performing the OTAR process, the SC controller 228 instructs the SC BS to interrupt data transmission and operate in an RX mode. Herein, the OTAR process may be performed at the initial installation of the SC BS, at the initialization of the SC BS, at the update of the preamble index, or by the order of a management server.

Particularly, at the initial installation of the SC BS or at the update of the preamble index, the SC controller 228 instructs the preamble detector 226 to detect the preamble signals of adjacent BSs. Also, the SC controller 228 generates preamble measurement information by using the preamble signals detected by the preamble detector 226. Also, the SC controller 228 generates a message for requesting preamble measurement information from the outside. Accordingly, the SC controller 228 allocates its own preamble index on the basis of the preamble measurement information generated by itself and the preamble measurement information received from the outside. Herein, the preamble measurement information may include a BS ID, a preamble index, and a preamble signal RX strength. In other words, the SC controller 228 allocates a preamble index that is not used by adjacent BSs. Also, when updating the preamble index, the SC controller 228 uses not only the preamble measurement information but also a preamble index collision report provided from user terminals.

According to an exemplary embodiment of the present invention, a target for requesting the preamble measurement information may be another SC BS or a management server. If the request target is another SC BS, a request for preamble measurement information from another SC BS may be generated. Thus, when a request for preamble measurement information from another SC BS is generated, the SC controller 228 provides the preamble measurement information generated by itself to the corresponding SC BS. At this point, the preamble measurement information received from another SC BS may be simultaneously provided. Also, if the request target is a management server, the management server retains the preamble measurement information of all the SC BSs. Thus, after allocating a preamble index, the SC controller 228 provides the preamble measurement information generated by itself to the management server.

The preamble generator 230 generates a preamble signal while the SC BS is operating as a base station. That is, the preamble generator 230 generates a preamble signal corresponding to the preamble index allocated by the SC controller 228, and provides the generated preamble signal to the subcarrier mapper 218.

Figure 3:
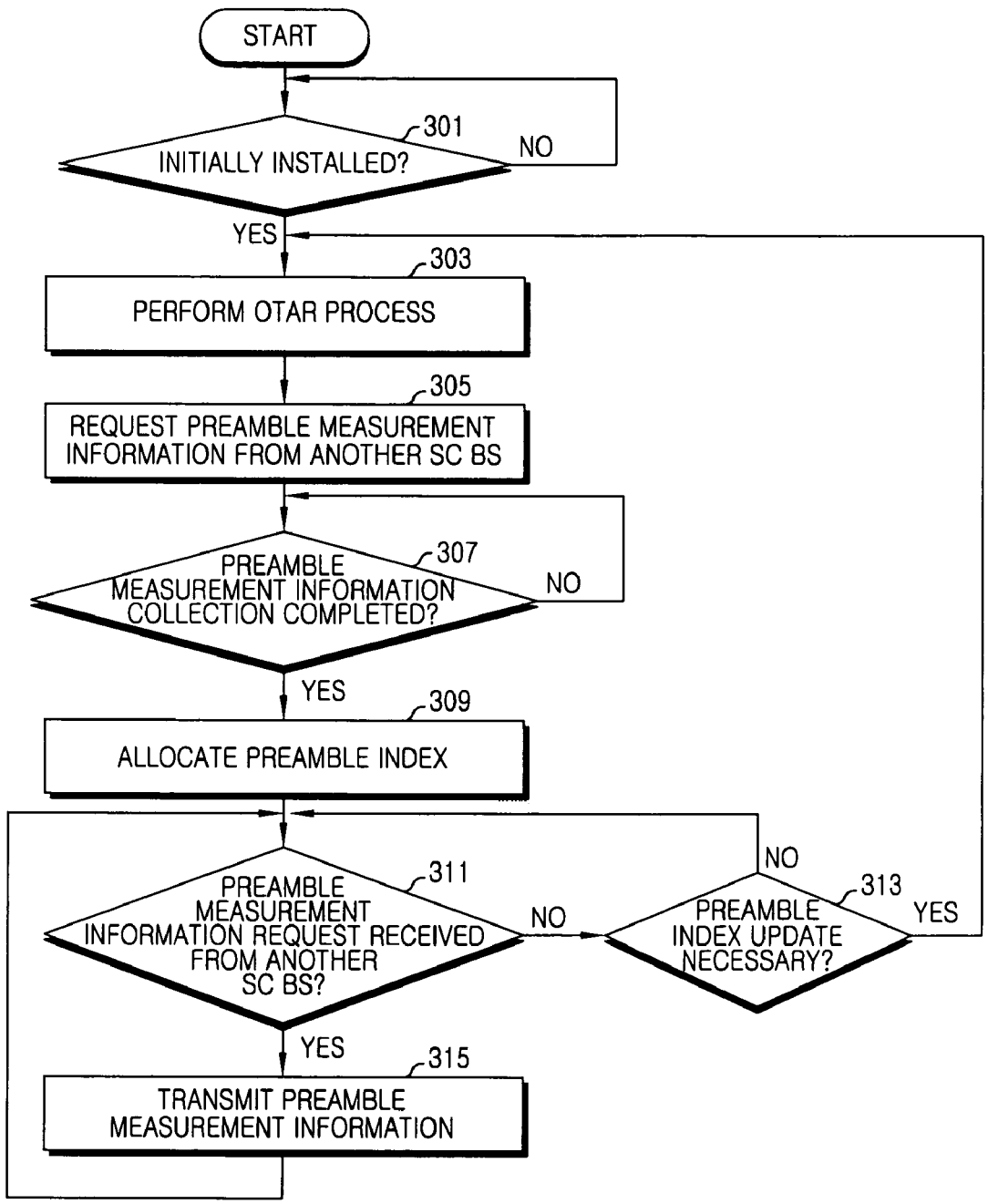
FIG. 3 is a flow chart illustrating a process for managing a preamble index of an SC BS in a broadband wireless communication system according to an exemplary embodiment of the present invention.

FIG. 3 is a flow chart illustrating a process for managing a preamble index of an SC BS in a broadband wireless communication system according to an exemplary embodiment of the present invention. FIG. 3 illustrates an exemplary embodiment of the case where preamble measurement information is provided from an SC BS.

Referring to FIG. 3, in step 301, the SC BS determines whether the SC BS is initially installed. Herein, the initial installation means the time when the SC BS is connected to a backbone network by a user and is turned on.

If the SC BS is initially installed (step 301), the SC BS proceeds to step 303. In step 303, the SC BS performs an OTAR process. That is, because nothing is set for its operation, the SC BS performs an OTAR process in order to detect peripheral communication environments. Accordingly, the SC BS detects the TX power, the preamble indexes, and the ID information of adjacent BSs. In particular, the SC BS detects the preamble signals of adjacent BSs through the OTAR process and generates preamble measurement information using the detected preamble signals.

In step 305, the SC BS requests preamble measurement information from at least one other SC BS. That is, the SC BS generates a message for requesting preamble measurement information, and transmits the generated message through the backbone network to the other SC BS.

In step 307, the SC BS determines whether the collection of preamble measurement information is completed. That is, the SC BS determines whether all the preamble measurement information has been received from the other SC BS. Herein, the preamble measurement information may include a BS ID, a preamble index, and a preamble signal RX strength.

If the collection of preamble measurement information is completed (step 307), the SC BS proceeds to step 309. In step 309, the SC BS allocates a preamble index for itself, i.e., a segment ID and an ID cell. Herein, the SC BS allocates its own preamble index on the basis of the preamble measurement information generated through the OTAR process and the preamble measurement information collected in step 307. In other words, the SC BS allocates a preamble index that is not used by adjacent BSs. If a preamble index collision report is received from a user terminal, the SC BS uses not only the preamble measurement information but also the preamble index collision report.

In step 311, the SC BS determines whether the SC BS receives a preamble measurement information request from another SC BS while operating as a base station, i.e., while communicating by means of a preamble signal corresponding to the allocated preamble index. In other words, the SC BS determines whether a preamble measurement information request message is received from another SC BS that is newly installed or is updating a preamble index. Herein, the preamble measurement information may include a BS ID, a preamble index, and a preamble signal RX strength.

If a preamble measurement information request is not received from another SC BS (step 311), the SC BS proceeds to step 313. In step 313, the SC BS determines whether a preamble index update is necessary. For example, if a preamble signal collision report is received from a user terminal or if a corresponding order is received from a management server, the SC BS determines that a preamble index update is necessary.

That is, the SC BS repeats steps 311 and 313 to determine whether a preamble measurement information request is received from another SC BS or whether a preamble index update is necessary. If a preamble index update is necessary (step 313), the SC BS returns to step 303. If a preamble measurement information request is received from another SC BS (step 311), the SC BS proceeds to step 315. In step 315, the SC BS provides preamble measurement information to the requesting SC BS. Thereafter, the SC BS returns to step 311. Herein, the preamble measurement information may include a BS ID, a preamble index, and a preamble signal RX strength.

Figure 4:
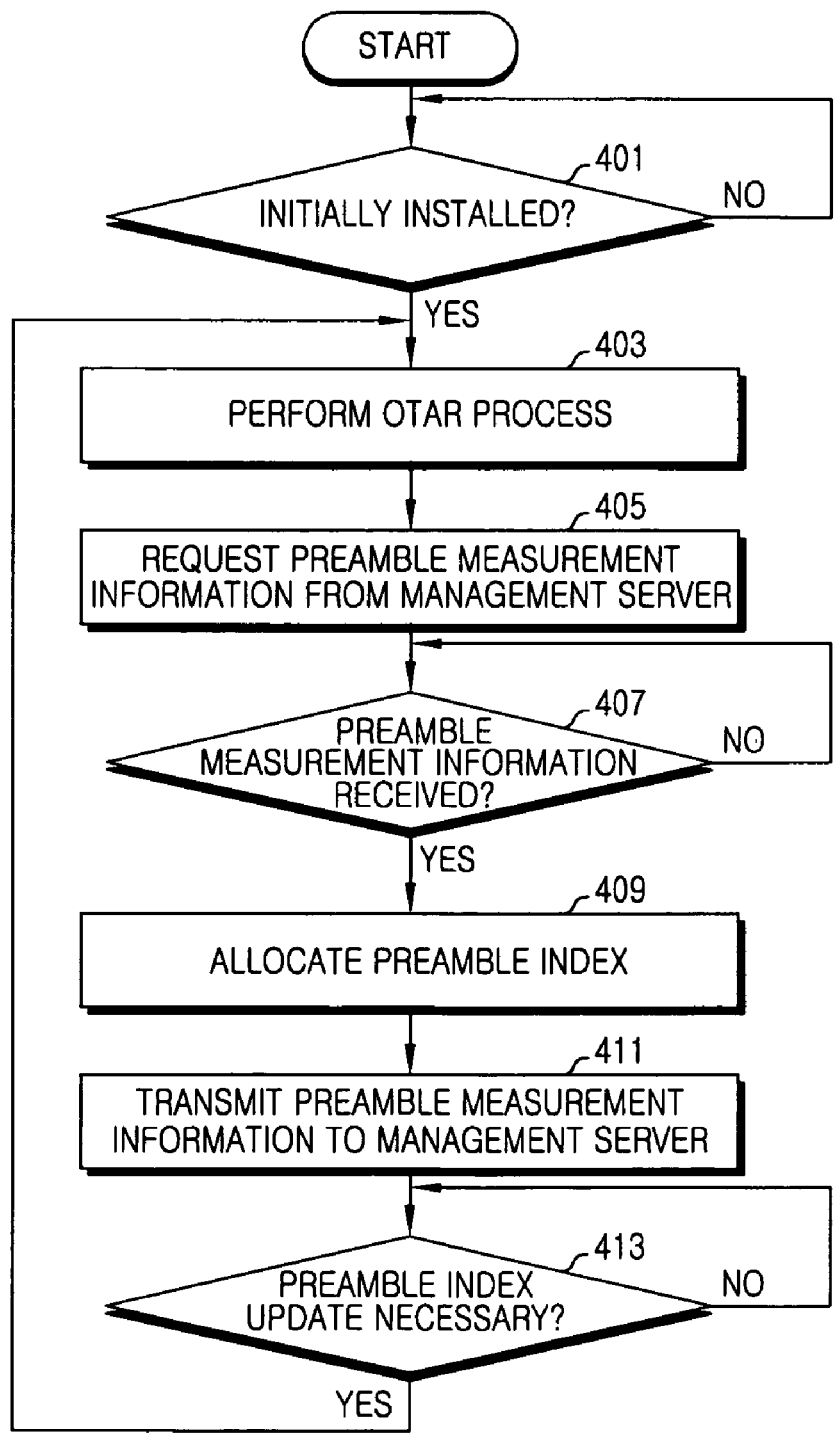
FIG. 4 is a flow chart illustrating a process for managing a preamble index of an SC BS in a broadband wireless communication system according to another exemplary embodiment of the present invention.

FIG. 4 is a flow chart illustrating a process for managing a preamble index of an SC BS in a broadband wireless communication system according to another exemplary embodiment of the present invention. FIG. 4 illustrates an exemplary embodiment of the case where preamble measurement information is provided from a management server.

Referring to FIG. 4, in step 401, the SC BS determines whether the SC BS is initially installed. Herein, the initial installation means the time when the SC BS is connected to a backbone network by a user and is turned on.

If the SC BS is initially installed (step 401), the SC BS proceeds to step 403. In step 403, the SC BS performs an OTAR process. That is, because nothing is set for its operation, the SC BS performs an OTAR process in order to detect peripheral communication environments. Accordingly, the SC BS detects the TX power, the preamble indexes, and the ID information of adjacent BSs. In particular, the SC BS detects the preamble signals of adjacent BSs through the OTAR process and generates preamble measurement information by using the detected preamble signals.

In step 405, the SC BS requests preamble measurement information from a management server. That is, the SC BS generates a message for requesting preamble measurement information, and transmits the generated message through the backbone network to the management server. Herein, the message may include information indicating the collection range of the preamble measurement information.

In step 407, the SC BS determines whether preamble measurement information is received. Herein, the preamble measurement information may include a BS ID, a preamble index, and a preamble signal RX strength.

If the collection of preamble measurement information is completed (step 407), the SC BS proceeds to step 409. In step 409, the SC BS allocates a preamble index for itself, i.e., a segment ID and an ID cell. Herein, the SC BS allocates its own preamble index on the basis of the preamble measurement information generated through the OTAR process and the preamble measurement information received from the management server. In other words, the SC BS allocates a preamble index that is not used by adjacent BSs. If a preamble index collision report is received from a user terminal, the SC BS uses not only the preamble measurement information but also the preamble index collision report.

In step 411, the SC BS transmits preamble measurement information to the management server. That is, the SC BS provides the preamble measurement information generated through the OTAR process to the management server. Herein, the preamble measurement information may include a BS ID, a preamble index, and a preamble signal RX strength.

In step 413, the SC BS determines whether a preamble index update is necessary while operating as a base station, i.e., while communicating by means of a preamble signal corresponding to the allocated preamble index. For example, if a preamble signal collision report is received from a user terminal or if a corresponding order is received from the management server, the SC BS determines that a preamble index update is necessary. If a preamble index update is necessary (step 413), the SC BS returns to step 403.

As described above, the present invention uses both of the preamble signal detection result of an SC BS and the preamble signal detection result of another SC BS to allocate the preamble index of the SC BS in the broadband wireless communication system, thereby making it possible to reduce the time required to allocate preamble indexes. Also, the present invention makes it possible to prevent the collision between preamble indexes that cannot be predicted only by the preamble signal detection result of the SC BS itself.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A Self-Configuration or Self-Configurable (SC) Base Station (BS) apparatus in a broadband wireless communication system, the apparatus comprising:
a detector for detecting at least one preamble signal for preamble index allocation by using a signal received from at least one other base station;
a controller for requesting information used by at least one other SC base station for preamble index allocation and for allocating a preamble index for the SC base station by using the detection result of the preamble signal and the information received from the at least one other SC base station; and
a generator for generating a preamble signal corresponding to the preamble index allocated by the controller.

2. The apparatus of claim 1, wherein the information used by the at least one other SC base station for preamble index allocation is preamble measurement information indicating the preamble signal detection result of the at least one other SC base station.

3. The apparatus of claim 2, wherein the preamble measurement information includes at least one of a preamble signal receive (RX) strength, a preamble index, and a BS IDentifier (ID) for the detected preamble signal.

4. The apparatus of claim 2, wherein the controller allocates the preamble index by using at least one of the detection result of the preamble signal, the information received from the at least one other SC base station, and a preamble index collision report received from at least one user terminal.

5. The apparatus of claim 2, wherein the controller generates the preamble measurement information indicating the detection result.

6. The apparatus of claim 5, wherein the controller requests information used by the at least one other SC base station for preamble index allocation from the at least one other SC base station.

7. The apparatus of claim 6, wherein if the at least one other SC base station requests preamble measurement information, the controller provides the preamble measurement information to the at least one other SC base station.

8. The apparatus of claim 5, wherein the controller requests information used by the at least one other SC base station for preamble index allocation from a management server.

9. The apparatus of claim 8, wherein the controller provides the preamble measurement information to the management server.

10. A method for managing a preamble index of a Self-Configuration or Self-Configurable (SC) Base Station (BS) in a broadband wireless communication system, the method comprising:
detecting at least one preamble signal for preamble index allocation by using a signal received from at least one other base station;
requesting information used by at least one other SC base station for preamble index allocation;
allocating a preamble index for the SC base station by using the detection result of the preamble signal and the information received from the at least one other SC base station; and
generating a preamble signal corresponding to the allocated preamble index.

11. The method of claim 10, wherein the information used by the at least one other SC base station for preamble index allocation is preamble measurement information indicating the preamble signal detection result of the at least one other SC base station.

12. The method of claim 11, wherein the preamble measurement information includes at least one of a preamble signal receive (RX) strength, a preamble index, and a BS IDentifier (ID) for the detected preamble signal.

13. The method of claim 11, wherein allocating the preamble index comprises allocating the preamble index by using at least one of the detection result of the preamble signal, the information received from the at least one other SC base station, and a preamble index collision report received from at least one user terminal.

14. The method of claim 11, further comprising generating the preamble measurement information indicating the detection result.

15. The method of claim 14, wherein requesting the information used by the at least one other SC base station for preamble index allocation comprises requesting the information used by the at least one other SC base station for preamble index allocation from the at least other SC base station.

16. The method of claim 15, further comprising, if at least one other SC base station requests preamble measurement information, providing the preamble measurement information to the at least one other SC base station.

17. The method of claim 14, wherein requesting the information used by the at least one other SC base station for preamble index allocation comprises requesting the information used by the at least one other SC base station for preamble index allocation from a management server.

18. The method of claim 17, further comprising providing the preamble measurement information to the management server.

19. The method of claim 10, further comprising determining if a preamble index update is required based at least partly upon a preamble index collision report received from a user terminal or an order received from a management server.

20. The method of claim 19, wherein if a preamble index update is required, performing an Over-The-Air Receiver (OTAR) process to update the allocated preamble index.

* * * * *